(12) United States Patent
Davies et al.

(10) Patent No.: US 11,340,705 B2
(45) Date of Patent: May 24, 2022

(54) EXPANDING PHYSICAL MOTION GESTURE LEXICON FOR AN AUTOMATED ASSISTANT

(71) Applicant: Google LLC, Mountain View, CA (US)

(72) Inventors: Ruxandra Davies, Santa Monica, CA (US); Lisa Takehana, San Bruno, CA (US)

(73) Assignee: GOOGLE LLC, Mountain View, CA (US)

( * ) Notice: Subject to any disclaimer, the term of this patent is extended or adjusted under 35 U.S.C. 154(b) by 94 days.

(21) Appl. No.: 16/340,597

(22) PCT Filed: Mar. 27, 2019

(86) PCT No.: PCT/US2019/024316
§ 371 (c)(1),
(2) Date: Apr. 9, 2019

(87) PCT Pub. No.: WO2020/139413
PCT Pub. Date: Jul. 2, 2020

(65) Prior Publication Data
US 2020/0301512 A1    Sep. 24, 2020

Related U.S. Application Data

(60) Provisional application No. 62/785,618, filed on Dec. 27, 2018.

(51) Int. Cl.
*G06F 3/00* (2006.01)
*G06F 3/01* (2006.01)

(52) U.S. Cl.
CPC .................................. *G06F 3/017* (2013.01)

(58) Field of Classification Search
CPC ........ G06F 3/005; G06F 3/017; G06F 3/0304; G06F 3/0484; G06K 9/00355
See application file for complete search history.

(56) References Cited

U.S. PATENT DOCUMENTS 9,448,634 B1 * 9/2016 Wakeford ............... G06F 3/017
2008/0040692 A1 * 2/2008 Sunday ............... G06F 3/04883
715/863

(Continued)

OTHER PUBLICATIONS

European Patent Office; Invitation to Pay Additional Fees for Ser. No. PCT/US2019/024316; 15 pages; dated Sep. 2, 2019.

(Continued)

*Primary Examiner* — Ram A Mistry
(74) *Attorney, Agent, or Firm* — Middleton Reutlinger

(57) ABSTRACT

Implementations provided herein relate to correlating available input gestures to recently created application functions, and adapting available input gestures, and/or user-created input gestures, to be correlated with existing application functions. Available input gestures (e.g., a hand wave) can be those that can be readily performed upon setup of a computing device. When a user installs an application that is not initially configured to handle the available input gestures, the available input gestures can be correlated to certain functions of the application. Furthermore, a user can create new gestures for application actions and/or modify existing gestures according to their own preferences and/or physical capabilities. When multiple users elect to modify an existing gesture in the same way, the modification can be made universal, with permission from the users, in order to eliminate latency when subsequently adapting to preferences of other users.

20 Claims, 10 Drawing Sheets

(56) References Cited

U.S. PATENT DOCUMENTS

| | | | |
|---|---|---|---|
| 2008/0163130 A1 | 7/2008 | Westerman | |
| 2011/0055846 A1 | 3/2011 | Perez et al. | |
| 2011/0154266 A1 | 6/2011 | Friend et al. | |
| 2013/0127712 A1* | 5/2013 | Matsubayashi | H04N 21/4223 345/158 |
| 2013/0275164 A1 | 10/2013 | Gruber et al. | |
| 2014/0157209 A1* | 6/2014 | Dalal | G06K 9/00355 715/863 |
| 2014/0282270 A1 | 9/2014 | Slonneger | |
| 2019/0356745 A1* | 11/2019 | Rosedale | H04L 67/22 |

OTHER PUBLICATIONS

European Patent Office; International Search Report and Written Opinion of Ser. No. PCT/US2019/024316; 21 pages; dated Oct. 30, 2019.

European Patent Office; Communication Pursuant to Article 94(3) EPC issue in Application No. EP 19716740.6; 8 pages; dated Dec. 11, 2020.

* cited by examiner

US 11,340,705 B2

EXPANDING PHYSICAL MOTION GESTURE LEXICON FOR AN AUTOMATED ASSISTANT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. Additionally, or alternatively, an automated assistant can receive a request from a user via a physical motion gesture that is captured by a camera or other vision component. An automated assistant can respond to a physical motion gesture by controlling a corresponding smart device and/or providing responsive user interface output, which can include audible and/or visual user interface output.

In some instances, a user may provide a physical motion gesture that, while intended by the user to cause performance of an automated assistant action, does not result in performance of the intended automated assistant action. For example, the physical motion gesture may be performed in a way that is not understandable by the automated assistant and/or may be a physical motion gesture that is not explicitly mapped to any automated assistant action. As a result, the automated assistant may be unable to fully process the physical motion gesture and/or can fail to determine that the gesture is a request for the automated assistant action. This leads to the automated assistant providing no response to the physical motion gesture, or providing only an error response, such as, "Sorry, I can't help with that" and/or an error tone. Despite the automated assistant failing to perform the intended automated assistant action corresponding to the physical motion gesture—or otherwise not identifying any executable action associated with the physical motion gesture, various computer and/or network resources are nonetheless consumed in processing the physical motion gesture and attempting to identify an appropriate action. For example, data corresponding to the physical motion gesture can be transmitted and/or undergo some amount of processing. Such consumption of resources is wasteful, since the intended action is not performed. Moreover, the user will likely attempt to provide alternate user interface input (e.g., a spoken command, a touch input, or an alternate physical motion gesture) or another instance of the physical motion gesture in again seeking performance of the intended action. Such subsequent user interface input will also have to be processed. This results in additional processing being performed and results in latency in performance of the action, as compared to if the user had instead initially provided a suitable physical motion gesture to the automated assistant. Accordingly, there exists a desire to improve the efficiency of physical motion gesture inputs.

SUMMARY

Implementations provided herein relate to correlating available input gestures to newly provided application functions, and adapting available input gestures, and/or user-created input gestures, to be correlated with existing application functions. A recently created application function can correspond to an action that can be performed by an application that has been installed at a computing device, which did not have the functionality to perform the action prior to the application being installed. Although the application function can be controlled via one or more user inputs (e.g., as established by a manufacturer of the application), the application function may not be controllable via any physical motion gestures. For instance, the user can install a security application on their home computing device, and the home computing device can also include a messaging application that the user typically controls using a lateral hand swipe gesture. Such control of the messaging application can be useful when the user is not available to directly touch an interface of the computing device, and/or has a handicap that prevents them providing a spoken utterance to the computing device. The computing device can determine that the user frequently uses the lateral hand swipe gesture, and also determine that an application function (e.g., viewing alerts of the security application) of the security application is not currently configured to be controlled via the lateral hand swipe gesture. Based on these determinations, the computing device can generate correlation data that maps the lateral hand swipe gesture to an application function of the security application. Optionally, the user can be prompted to confirm the mapping and/or otherwise be put on notice that the lateral hand swipe gesture is available to control one or more functions of the security application. This can allow the user to decide whether the gesture should be mapped to a function of the security application.

A particular gesture can be selected for mapping to a particular application function, and/or action, based on one or more different criteria. In some implementations, a gesture can be identified for mapping to an application based on a frequency at which the user performs the gesture relative to other gestures. Additionally, or alternatively, the gesture can be identified for mapping to an application based on how many times the user has performed the gesture successfully. As an example, a computing device can determine that the user performs a first gesture with a 90% success rate and a second gesture with an 85% success rate, and based on these determinations, the first gesture can have priority when identifying a gesture to map to an application function. Therefore, after the user has installed a particular application that includes multiple different application functions not immediately controllable via a gesture input, a particular application function (e.g., viewing alerts of a security application) that is being used most frequently can be identified. The most frequently used application function can then be mapped to the most frequently used and/or most successfully performed input gesture performed by the user. Thereafter, interactions between the user and the particular application can be analyzed in order to determine any other application functions that should be mapped to other input gestures.

In some implementations, a "lexicon" (i.e., a set) of input gestures available to a user can be expanded as a result of the user attempting gestures that may be initially unfamiliar to the computing device and/or another device that is tasked with responding to the gestures. When the user attempts an input gesture for the first time, a computing device can recognize that the attempt by the user is a first attempt, and generate data for characterizing the input gesture. The data, with prior permission from the user, can be compared to other data that characterizes other input gestures performed by other users. The data can be compared in order to determine whether the input gesture provided by the user has one or more characteristics in common with any gesture of the other input gestures. For example, the data can characterize the input gesture as having at least an elbow-swinging motion, and the other data can characterize at least one other gesture as also having at least an elbow-swinging motion. In response to determining that the input gesture and the other gesture have at least one characteristic in common, the user can be prompted, at an interface of a computing device, to confirm whether the input gesture, which the user attempted, corresponds to the other input gesture that has been identified. The prompt can be provided at a graphical interface and include a graphical depiction of the other input gesture. Additionally, or alternatively, the prompt can include a textual description of the other input gesture, and, optionally, the one or more trained machine learning models can be used to generate the textual description (e.g., based on image(s), audio, and/or video(s) of the other input gesture). The prompt can correspond to a request for the user to confirm whether the user intended the input gesture to be an imitation of the other input gesture.

Should the user confirm that they intended the input gesture to imitate the other input gesture that was identified, an application function that is controllable via the computing device can be identified as being correlated to another application function that the other input gesture controlled. Based on the identified correlation, the application function can be configured at the computing device such that the application function is controllable via the input gesture. The correlation can be identified based on the other application function and the application function having one or more parameters, and/or one or more parameters values, in common. For instance, the other application function can be a "browser refresh" function, and a parameter of the other application function can include a "name" of the browser to be refreshed. Furthermore, the application function can be a "website refresh" function, which can also have a parameter that includes the "name" of a browser to be refreshed. Therefore, based on this shared parameter, the application function and the other application function can be considered correlated, and the input gesture can be mapped to the application function.

In some implementations, should the user not confirm that they intended the input gesture to imitate the other input gesture, one or more application functions that are controllable via the computing device can be identified. Based on the input gesture having not been previously performed by the user, the user can be prompted to select a particular application function, from the one or more application functions, to be mapped to the input gesture. This can allow the user to expand a "lexicon" of the computing device and/or an application, at least with respect to how many gestures the computing device and/or the application can be responsive. When the user has selected a particular application function, the user can optionally be prompted to provide another instance of the input gesture for confirming the exact input gesture that is to be mapped to the particular application function. Furthermore, by generating additional data related to another instance of the input gesture, the additional data can be used for training one or more machine learning models that will process inputs that are based on various input gestures from the user.

In other implementations, a user can assign an input gesture to control an action of an application by performing the input gesture one or more times, in order to "hint" to their respective computing device that they would like the input gesture to be recognized by the computing device. Furthermore, the user can cause the action of the application to be performed within some time period of performing the input gesture one or more times. As an example, the user can initialize their stove top burners to boil water, and the oven can have an integral computing device that is connected, via a local area network, to home computing device that includes a camera interface. The user can desire that their stove top burners be controllable via one or more hand gestures that include a "stop" hand gesture, which can correspond to the user extending their hand out flat in front of them. In order to initialize such a configuration, the user can perform the "stop" hand gesture, such that the "stop" hand gesture is captured by the home computing device, while the oven burner is actively boiling a pot of water. In other words, the home computing device and/or the oven have not previously been configured to be responsive to the "stop" hand gesture, and the home computing device may not be responsive to the "stop" hand gesture—but, regardless, the home computing device can capture image data corresponding to the "stop" hand gesture (with prior permission from the user).

Thereafter, or before performing the "stop" hand gesture, the user can turn off the oven burner. The home computing device can determine that the user performed the "stop" hand gesture within a period of time of turning off the oven burner, and provide a request for the user to confirm whether the user would like the "stop" hand gesture to control the oven burner. Should the user confirm that they intended the "stop" hand gesture to control the oven and/or turn off the oven burner, the home computing device can cause data to be generated for indicating that the oven is to be controllable via an instance of the physical motion gesture. In other words, the home computing device can communicate with the oven and/or a server device to establish a setting that allows the oven to be responsive to the home computing device (and/or any other computing device associated with the user) determining that the user performed the "stop" hand gesture.

In some implementations, in order for the user to configure their computing device(s) to be responsive to an input gesture that they had not been previously used to control an action of an application and/or a computing device, one or more initial instances of the input gesture can be captured. Data characterizing the user performing the input gesture can be compared to other data associated with one or more input gestures that were already available for the user to perform. The other data can characterize a set of input gestures that were available for the user to perform since they initially setup their home computing device and/or installed one or more applications at the home computing device. Additionally, or alternatively, the other data can characterize the set of input gestures and/or one or more other inputs gestures that one or more other users have performed. For example, the one or more other input gestures can be supplemental input gestures that were not initially available to one or more other users, until those one or more other users created the one or more other input gestures. Therefore, when the user initially performs an input gesture for the first time, the data characterizing the input gesture can be used to determine whether the input gesture corresponds to an existing gesture, which can includes gestures within an initial set of gestures and/or within the supplemental input gestures created by other users. When the input gesture is determined to not correspond to any gesture of the initial set of input gestures and/or the supplemental input gestures created by other users, the user can be prompted with a request to establish an entirely new input gesture. The new input gesture can then be correlated to one or more actions of an application(s) and/or a computing device(s), as indicated by the user, and/or as suggested by an application(s) and/or a computing device(s).

The above description is provided as an overview of some implementations of the present disclosure. Further description of those implementations, and other implementations, are described in more detail below.

In some implementations, a method implemented by one or more processors is set forth as including operations such as processing image data, captured via a camera interface of a computing device, which characterizes a physical motion gesture has been provided by a user to a computing device, wherein the computing device is controllable via the physical motion gesture and an application, which is accessible via the computing device, is currently unresponsive to the physical motion gesture. The method can further include determining that the application: includes an application function that is being used by the user, and that the application function is not responsive to the physical motion gesture provided by the user to the camera interface of the computing device. The method can further include causing, based on determining that the application function is not responsive to the physical motion gesture, correlation data to be generated for correlating the physical motion gesture to the application function in furtherance of allowing the user to control the application function of the application via the physical motion gesture. The method can further include determining, subsequent to generating the correlation data, whether the user has performed the physical motion gesture in furtherance of controlling the application function of the application. The method can further include, when the user is determined to have performed the physical motion gesture subsequent to the correlation data being generated, causing, in response to determining that the user performed the physical motion gesture, the application function to be controlled via the application.

In some implementations, the application function is not directly executable via the computing device without the application executing at the computing device. In some implementations, the method can further include causing, prior to the correlation data being generated, a prompt to be provided at the computing device requesting that the user confirm correlating the physical motion gesture to the application function of the application. In some implementations, determining that the application includes the application function that is being used by the user includes: determining that the physical motion gesture has been performed by the user more frequently than the user has performed at least one other physical motion gesture. In some implementations, that the application includes the application function that is being used by the user includes: determining that the physical motion gesture has been performed more accurately by the user than another user has performed the physical motion gesture at a different computing device. In some implementations, determining that the application includes the application function that is being used by the user includes: determining that the user has controlled multiple different application functions of the application, wherein the multiple different application functions include the application function, and determining that the application function of the multiple different applications has been controlled, by the user, more frequently relative to other application functions of the multiple different application functions have been controlled by the user. In some implementations, the method can further include determining, subsequent to generating the correlation data, that a separate application function of the application is not currently responsive to a particular motion gesture that is different from the physical motion gesture; and causing, based on determining that the separate application function of the application is not currently responsive to the particular motion gesture, other correlation data to be generated for correlating the particular motion gesture to the separate application function in furtherance of allowing the user to control the separate application function of the application via the particular motion gesture. In some implementations, the method can further include determining, prior to determining that the application includes the application function that is being used by the user, that the user has controlled the application function of the application more frequently than the user has controlled the separate application function.

In other implementations, a method implemented by one or more processors is set forth as including operations such as determining, based on data generated in response to a gesture input to a computing device, that a user has performed a particular gesture that the user has not previously provided as an input to the computing device. The method can further include determining, based on the data, that a separate gesture input was previously provided a separate computing device by a different user, and that the separate gesture input has one or more characteristics in common with the gesture input provided by the user to the computing device, wherein the separate gesture input was previously provided to the separate computing device to control an application function of the separate computing device. The method can further include causing, in response to determining that the separate gesture input has one or more characteristics in common with the gesture input, an interface of the computing device or another computing device to provide a request to the user to confirm whether the user intended the gesture input to imitate the separate gesture input. The method can further include, when, in response to causing the interface of the computing device or the other computing device to provide the request to the user, the user confirms they intended the gesture input to imitate the separate gesture input: determining that another application function is controllable via the computing device and that the other application function includes a common feature to the application function, and causing the application function to be controllable via an instance of the gesture input.

In some implementations, the method can further include, when, in response to causing the interface of the computing device or the other computing device to provide the request to the user, the user indicates they did not intend the gesture input to imitate the separate gesture input: identifying one or more applications functions that are controllable via the computing device, and prompting the user to select a particular application function of the one or more application functions to be controllable via the gesture input. In some implementations, the method can further include, when, in response to causing the interface of the computing device or the other computing device to provide the request to the user, the user indicates they did not intend the gesture input to imitate the separate gesture input: determining, that the user has selected the particular application function of the one or more application functions to be controllable via the gesture input, and causing the interface of the computing device or the other computing device to provide another request for the user to perform another instance of the gesture input. In some implementations, the common feature is a common parameter, and causing the application function to be controllable via the instance of the gesture input includes causing a parameter value to be assigned to the common parameter when the user subsequently performs the instance of the gesture input. In some implementations, determining that another application function is controllable via the computing device includes: identifying an application, from multiple different applications, that the user has previously controlled without providing a physical motion gesture to a camera interface of the computing device, and determining one or more different application functions that are controllable via the application, wherein the one or more different application functions include the application function.

In yet other implementations, a method implemented by one or more processors is set forth as including operations such as determining, based on processing image data captured via a camera interface of a computing device from which one or more applications are accessible, that a user has performed a physical motion gesture one or more times, wherein the one or more applications are responsive to other physical motion gestures and the one or more applications are currently unresponsive to the physical motion gesture. The method can further include determining that the user has caused an action to be performed: via an application of the one or more applications, and within a period of time of the user performing the physical motion gesture one or more times. The method can further include causing, in response to determining that the user caused the action to be performed via the application, an interface of the computing device or another computing device to provide a request to the user to confirm whether the user intended the physical motion gesture to control the action performed via the application. The method can further include, when, in response to causing the interface of the computing device or the other computing device to provide the request to the user, the user confirms they intended the physical motion gesture to control the action performed by the application: generating control data that indicates the action performed by the application is controllable via an instance of the physical motion gesture.

In some implementations, determining that the user has performed the physical motion gesture one or more times includes: determining that the image data, and/or gesture data characterizing the performance of the physical motion gesture by the user, is associated with other data that corresponds to a particular physical motion gesture of one or more other physical motion gestures. In some implementations, the particular physical motion gesture is associated with another user that configured another computing device and/or another application to be responsive to the particular physical motion gesture. In some implementations, the other data, which corresponds to the particular physical motion gesture, is generated based on each user, of multiple different users, performing an instance of the particular physical motion gesture. In some implementations, the period of time is based on: an action type corresponding to the action performed via the application, and/or an application type corresponding to the application. In some implementations, the request to confirm whether the user intended the physical motion gesture to control the action performed via the application includes providing a request for the user to perform another instance of the physical motion gesture in order to indicate confirmation. In some implementations, the method can further include identifying another function of the application that is not currently responsive to another physical motion gesture captured via the camera interface of the computing device; and when the user confirms they intended the physical motion gesture to control the action performed by the application: causing the interface of the computing device to provide another request for permission from the user to allow the other function to be controllable via the other physical motion gesture.

In other implementations, a method implemented by one or more processors is set forth as including operations such as determining, based on processing image data captured via a camera interface of a computing device from which one or more applications are accessible, that a user has performed a physical motion gesture one or more times, wherein the one or more applications are responsive to other physical motion gestures and the one or more applications are currently unresponsive to the physical motion gesture. The method can further include determining that the user has caused an action to be performed: via an application of the one or more applications, and within a period of time of the user performing the physical motion gesture one or more times. The method can further include generating control data that indicates the action performed by the application is controllable via an instance of the physical motion gesture.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
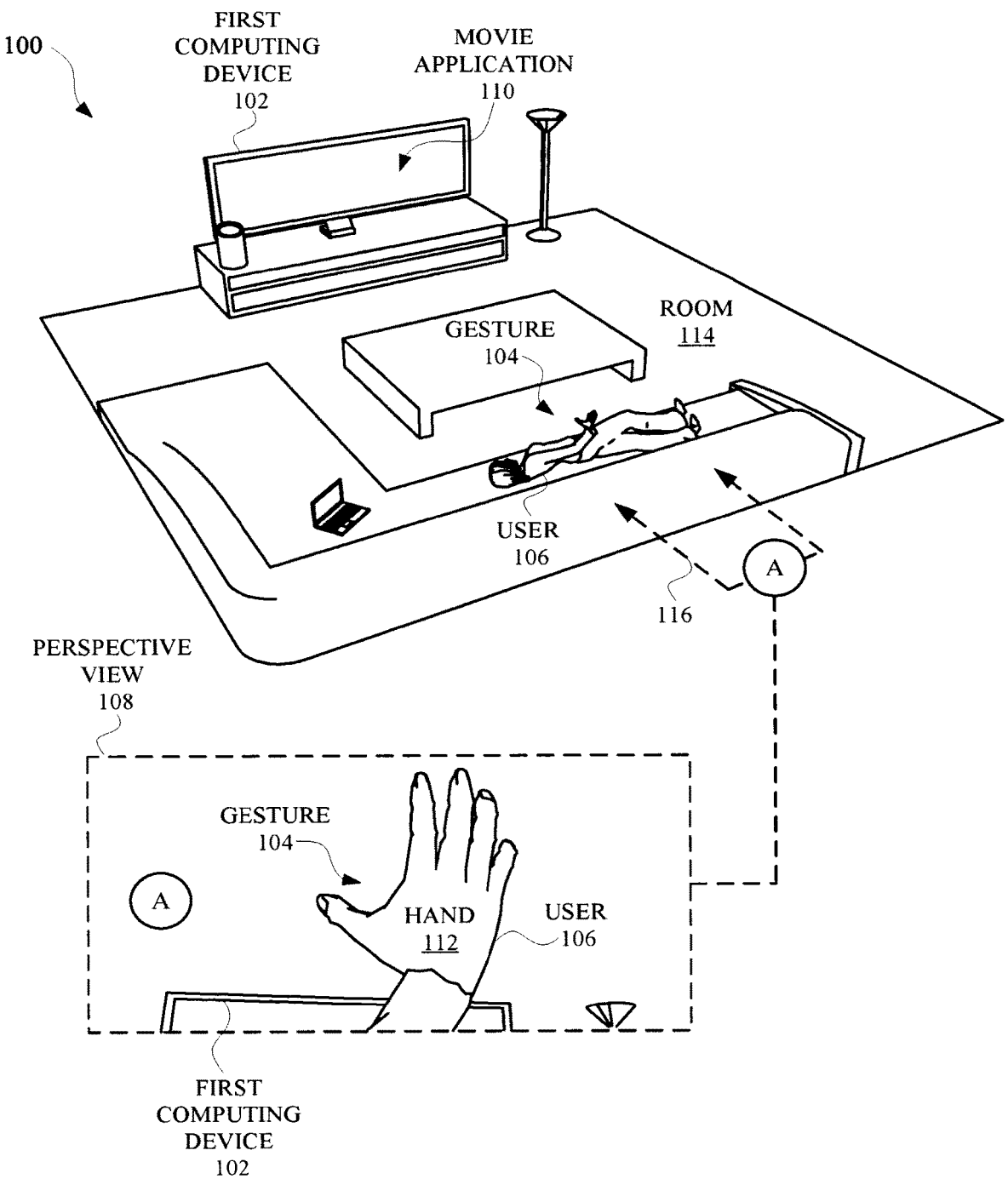
FIG. 1A, FIG. 1B, and FIG. 1C include views of a user configuring an application to be responsive to a physical motion gesture that the user has previously employed to control one or more device and/or application functions.
Figure 1B:
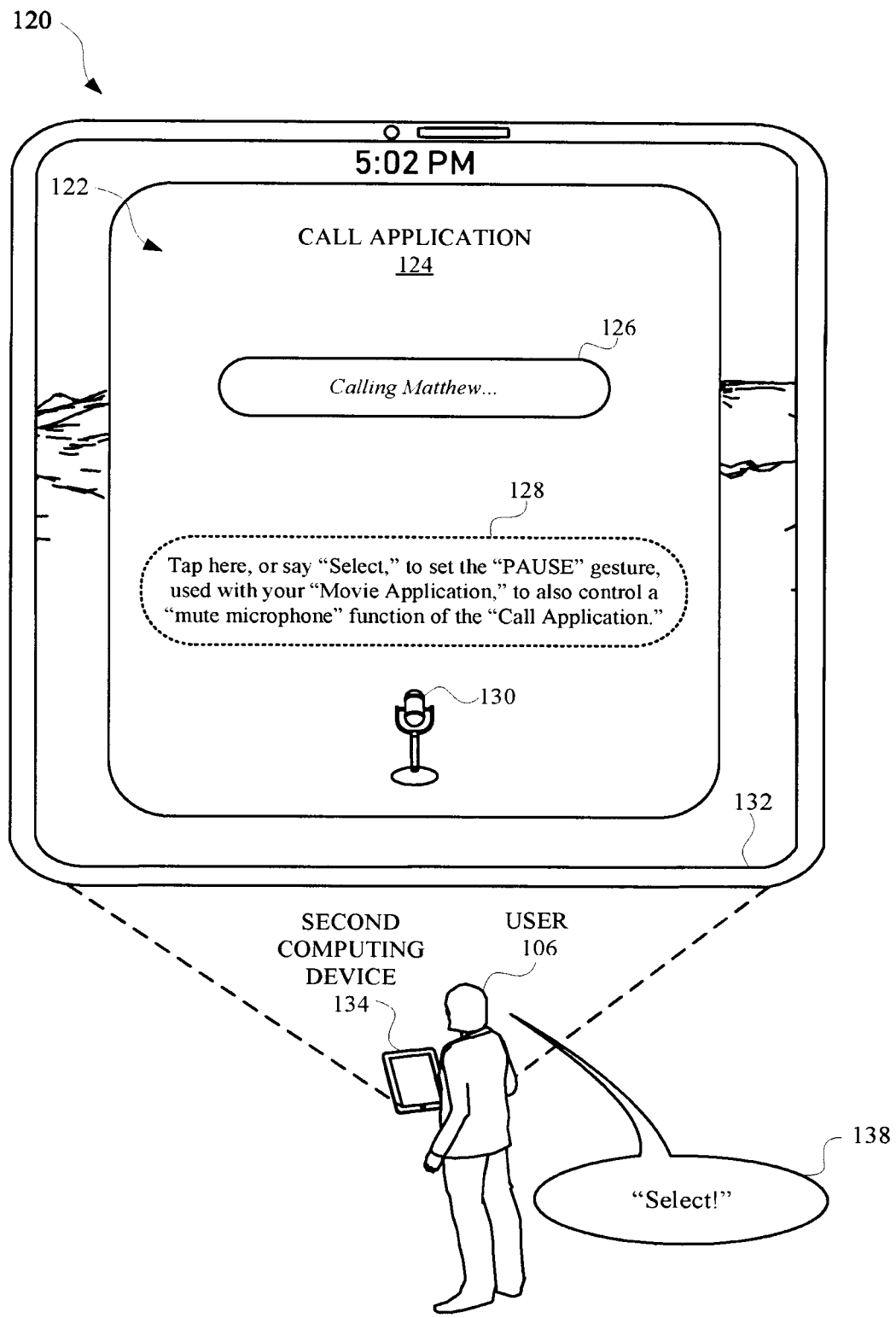
Figure 1C:
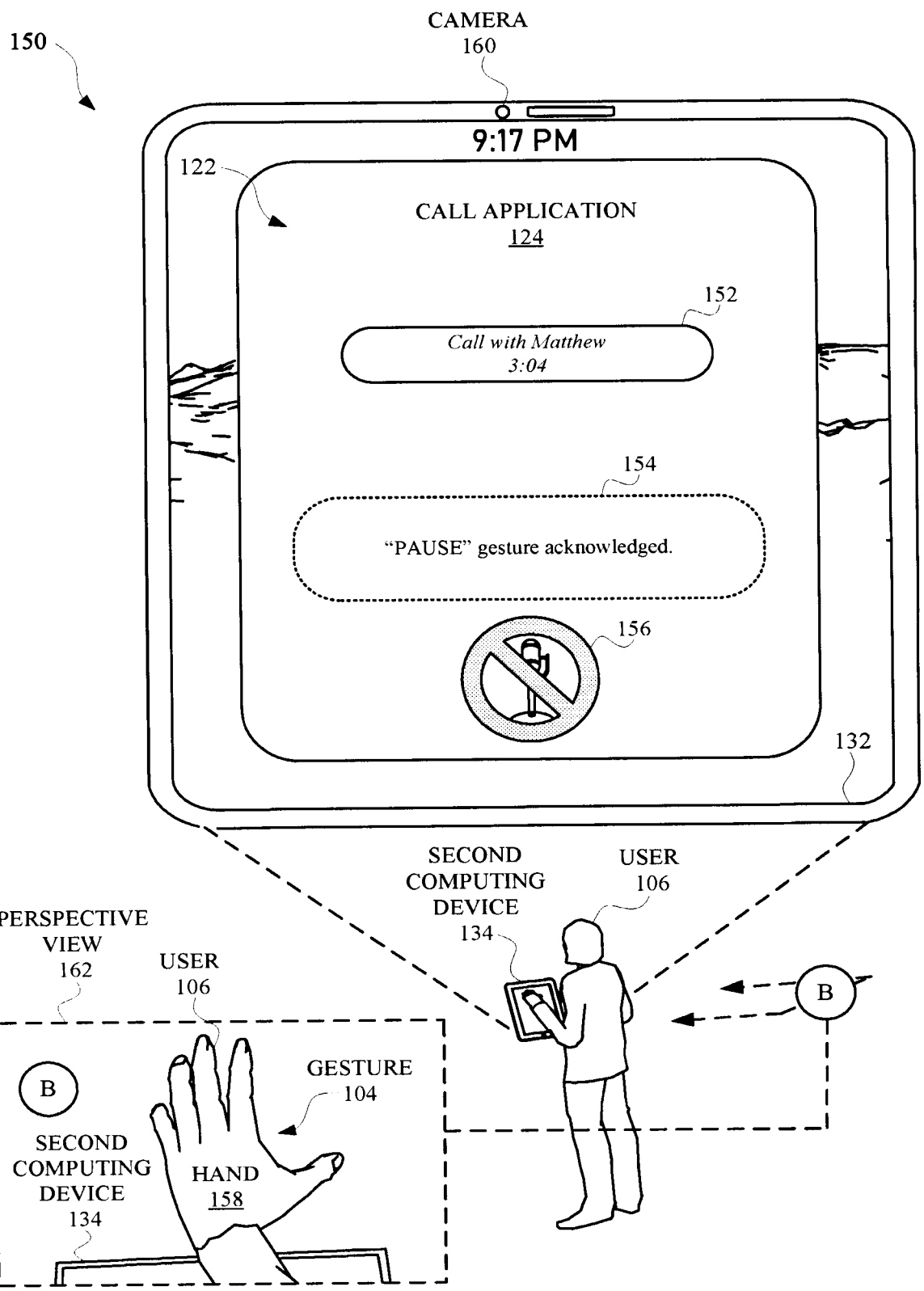

FIG. 1A, FIG. 1B, and FIG. 1C include view 100, view 120, and view 150, respectively, of a user 106 configuring an application to be responsive to a physical motion gesture 104 that the user 106 has previously employed to control one or more device and/or application functions. Specifically, FIG. 1A provides a view 100 of a user performing the gesture 104 while a movie application 110 is executing at a first computing device 102, and FIG. 1A and FIG. 1B provide view 120 and view 150, respectively, of a second computing device 134 guiding the user 106 to configure a call application 124 to also be responsive to the gesture 104.

FIG. 1A illustrates a view 100 of the user 106 watching a movie that is being provided by a movie application 110, and being rendered by a first computing device 102. The movie application 110 can be an application that is installed by a manufacturer of the first computing device 102, installed by the user 106, and/or otherwise accessible via the first computing device 102 and/or over a network, such as the internet. The movie application 110 can be responsive to one or more physical motion gestures capable of being performed by the user 106.

The movie application 110 can determine and that the user is performing a particular gesture based on image data captured via a camera of the first computing device 102. For example, the first computing device 102 can be disposed within a room 114, and a camera that is attached to the first computing device 102 can be directed (as setup by the user 106) into a direction of the user 106, when the user is viewing the first computing device 102. In this way, the user 106 is able to control various functions and/or actions of the first computing device 102, the movie application 110, and/or any other application that is accessible to the first computing device 102, using physical motion gestures.

As an example, the movie application 110 can be responsive to a gesture 104, in which the user raises their hand 112 away from their body, and opens their palm towards the camera of the first computing device 102. For clarity, a perspective view 108 is provided as a close up of the gesture 104 being performed by the user 106. Furthermore, element "A" is illustrated for purposes of indicating a direction 118 from which the perspective view 108 is based. The first computing device 102 can generate image data capturing the gesture 104, and the movie application 110 can determine, based on processing of the image data, that the user has performed a particular gesture that controls a particular function of the movie application 110. Specifically, the gesture 104 can be a "pause" gesture, and when the movie application 110 is playing a movie, detection of the "pause" gesture can cause playback of the movie to pause. Although the user 106 may frequently use this gesture 104 with respect to the movie application 110, the user 106 can be provided with suggestions for allowing other functions to be controllable via the gesture 104. Alternatively, or additionally, the user 106 can configure one or more of their devices and/or applications to be controllable via the gesture 104 without having previously been suggested such a configuration.

In some implementations, the first computing device 102, a server device, and/or an application that is accessible via the first computing device 102 and/or the server device, can determine that the gesture 104 is performed most frequently by the user 106, at least relative to one or more other gestures previously performed by the user. Based on this determination, the gesture 104 can be the subject of one or more different suggestions that can be provided to the user 106 when they are interacting with one or more devices and/or one or more applications. Alternatively, or additionally, the gesture 104 can be selected as the subject of one or more suggestions based on the user 106 having performed the gesture 104 successfully and/or accurately more times than the user 106 has performed, or attempted to perform, one or more other gestures.

FIG. 1B illustrates a view 120 of the user 106 interacting with a call application 124 using a computing device 134. While operating the second computing device 134, the second computing device 134 and/or the call application 124 can cause a suggestion 128 to be provided to the user 106. The suggestion 128 can be generated and/or provided at an interface 122 of the call application 124 when the user 106 is controlling a function of the call application 124 and/or when the call application 124 is operating according to a particular state. As an example, the suggestion 128 can be provided at a display panel 132 of the second computing device 134 in response to the user 106 initializing a call 126 via a call function of the call application 124. The call application 124, the first computing device 102, the second computing device 134, an automated assistant, and/or the server device can determine that the call function is a function of the call application 124 that the user 106 most frequently uses relative to other functions of the call application 124. Therefore, a suggestion 128 can be provided in an attempt to allow the user 106 to correlate a most frequently used function of one application with a most frequently used physical motion gesture that the user 106 employs to control when interacting with a different application. In order to further clarify the suggestion, the suggestion 128 can include text such as "Tap here, or say 'select,' to set the 'pause' gesture, used with your 'Movie Application,' to also control a 'mute microphone' function of the 'Call Application.'"

By providing the user 106 with the opportunity to configure a mute microphone function of the call application 124 to be responsive to the gesture 104 that the user 106 is already familiar with, interactions between the user 106 and the call application 124 can be streamlined. The user may thus submit commands to a respective computing device which are more efficiently handled. In this way, interaction time between the user 106 and a respective computing device can be decreased, thereby preserving computational resources and power resources, such as battery life. For example, when it is not convenient for the user 106 to perform some manual touch gesture at the display panel 132 (e.g., the user 106 is in a kitchen, and has dough on their hands) to control a particular function, the user 106 would be able to control that particular function using whichever physical motion gesture of their choosing via a camera of the second computing device 134.

In order to configure the call function to be controllable via the gesture 104, the user can select the suggestion 128 by tapping the display panel 132 at the graphical element representing the suggestion 128. Alternatively, or additionally, the user 106 can provide a spoken utterance 138, indicating their permission to use the gesture 104 to control the mute microphone function of the call application 124. The mute microphone function can control whether a recipient of a call can hear the user 106, and an operating status of the mute microphone function can be optionally indicated by an icon 130. For instance, as provided in FIG. 1B, the user 106 can explicitly indicate there willingness to configure the mute microphone function to be controllable via the gesture 104 by providing the spoken utterance 138, "Select!"

In response to the user indicating their willingness to configure the mute microphone function to be controllable via the gesture 104, the call application 124 can thereafter be configured to be responsive to subsequent instances of the gesture 104. For example, as illustrated in view 150 of FIG. 1C, the user 106 can invoke a call function of the call application 124, thereby causing an interface 122 of the call application 124 to indicate a call status 152 of the call application 124. During the call, the user 106 can perform the gesture 104 using their hand 158. A camera 160 can capture the gesture 104 by providing an output, which can be used to generate image data, and the image data can then be processed in order to verify that the gesture 104 was performed by the user 106. FIG. 1C provides a perspective view 162 of the user 106 performing the gesture 104, and the perspective view 162 can be relative to a viewpoint indicated by element "B."

In response to determining that the user 106 performed the gesture 104, the mute microphone function of the call application 124 can be executed. Furthermore, in response to the gesture 104, an updated status icon 156 can be provided at the interface 122 of the call application 124. Alternatively, or additionally, a graphical element 154 can be provided at the display panel 132 and indicate that the pause gesture has been acknowledged. By executing the "mute microphone" function, the microphone of the second computing device 134 can be temporarily muted while the "Call with Matthew" is ongoing.

In some implementations, as the user 106 continues to use the call application 124, and/or any other application that can be accessible to a computing device, a frequency of each function of an application can be determined at various points and/or periodically. Specifically, a frequency of usage of each function that is not currently correlated to a physical motion gesture can be determined at various points and/or periodically. Therefore, when a most frequently used function is correlated to a physical motion gesture, a most frequently used function can be identified for suggesting another physical motion gesture for correlating to the next most frequently used function. This process can repeat until multiple different functions of multiple different applications and/or devices that are accessible to a computing device are controllable via one or more different physical motion gestures that can be captured via a camera interface of the computing device. Furthermore, additional physical motion gestures can be created by the user 106, in order to provide even more functionality and/or responsiveness to one or more devices and/or one or more applications.

Figure 2A:
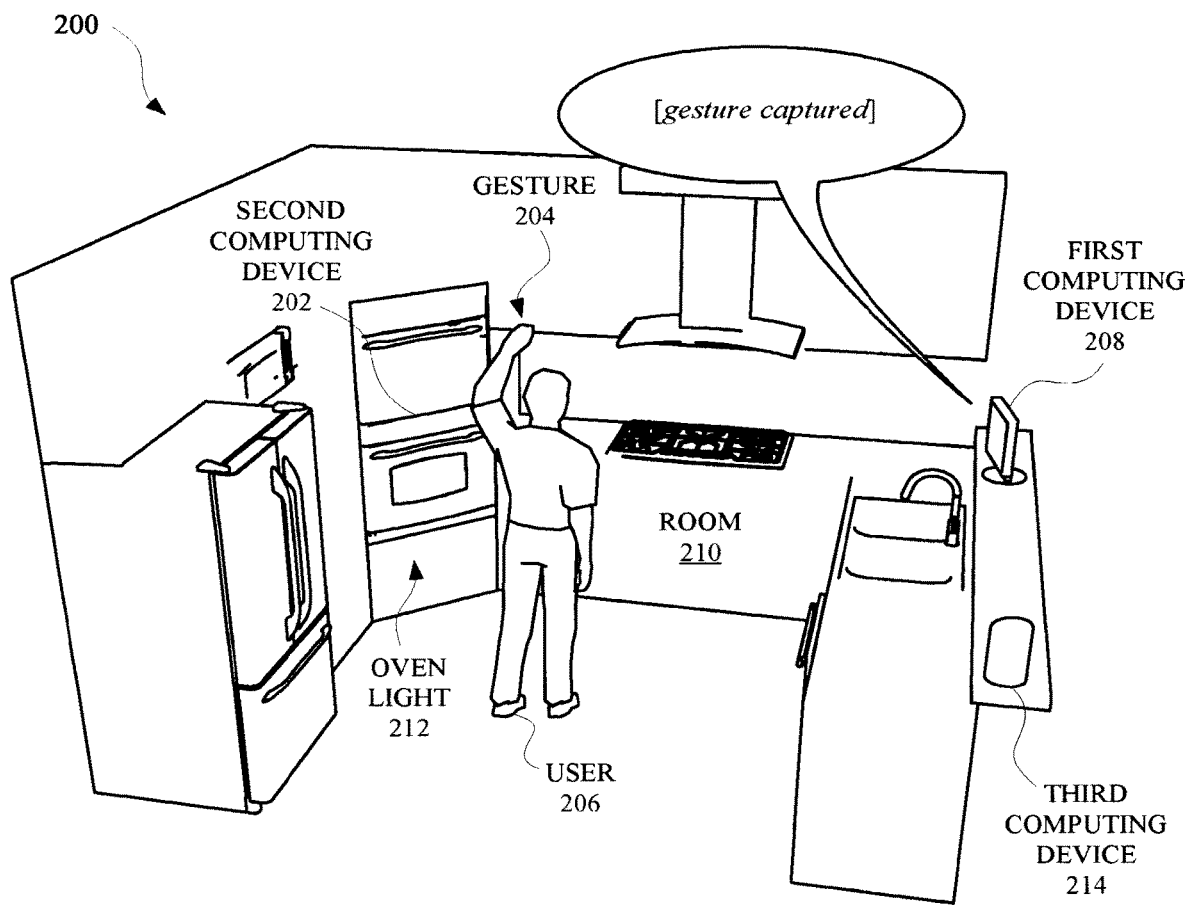
FIG. 2A, FIG. 2B, and FIG. 2C illustrate views of a user configuring a computing device and/or an application to be responsive to a physical motion gesture by performing the physical motion gesture within a time period of controlling a function of the computing device and/or the application.
Figure 2B:
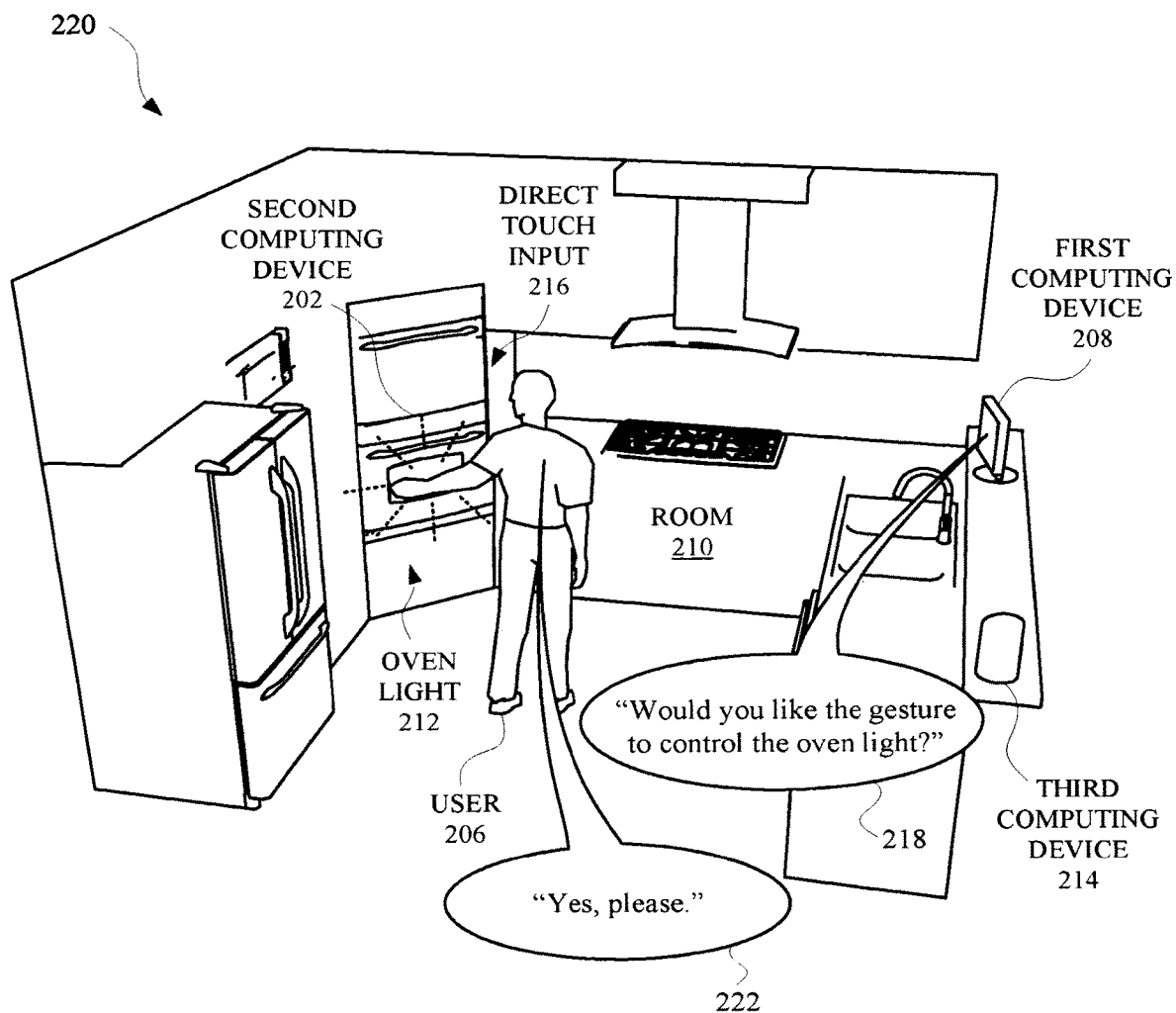
Figure 2C:
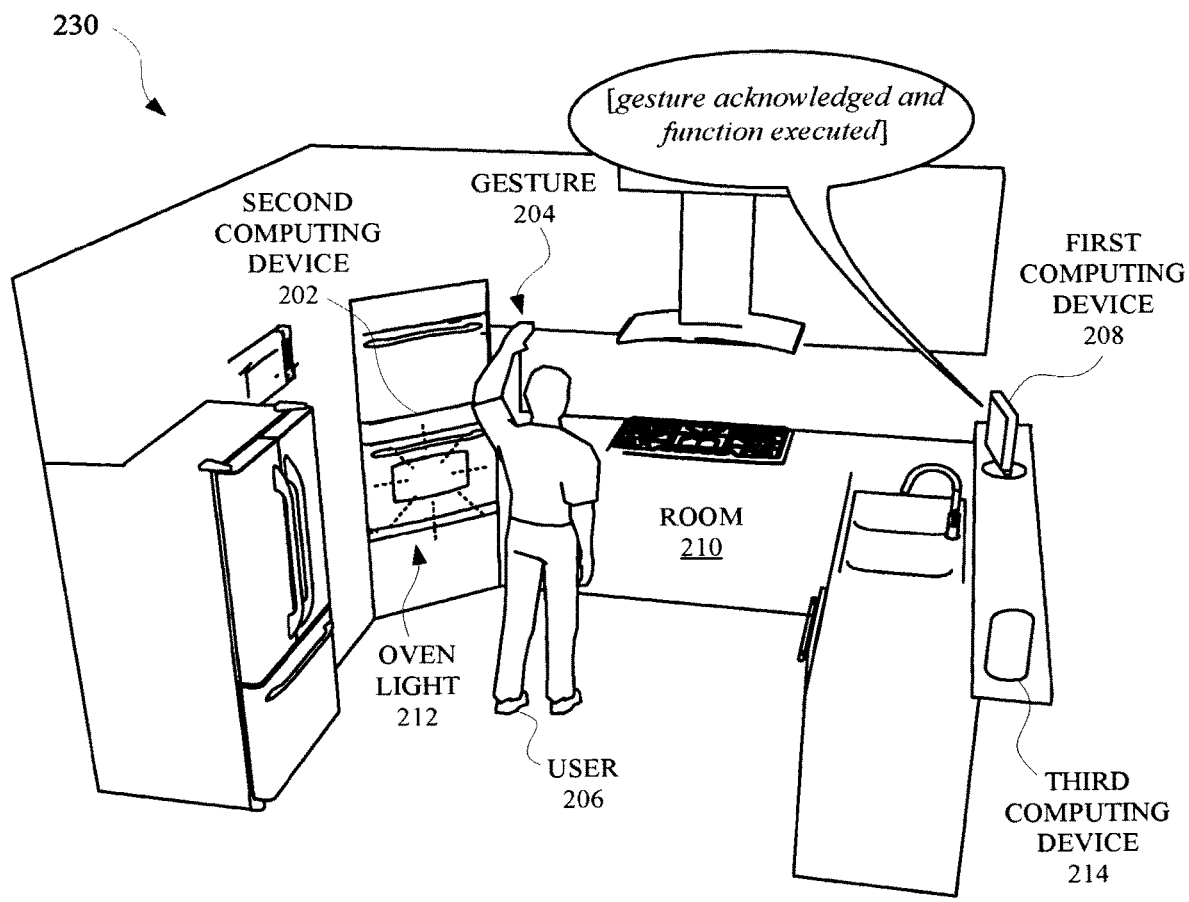

FIG. 2A, FIG. 2B, and FIG. 2C illustrate a view 200, a view 220, and a view 230, respectively, of a user 206 configuring a computing device and/or an application to be responsive to a physical motion gesture by performing the physical motion gesture within a time period of controlling a function of the computing device and/or the application. Specifically, FIG. 2A illustrates the user 206 performing a gesture 204 that they would like a second computing device 202 to be responsive to, despite the second computing device 202 not currently being responsive to the gesture. FIG. 2B illustrates the user 206 controlling the function (e.g., turning on an oven light 212) that the user 206 would like the gesture 204 to control, and FIG. 2C illustrates the user 206 performing the gesture 204, and thereby effectively controlling the function of the second computing device 202.

As illustrated in FIG. 2A, the user 206 can walk into a room 210, such as a kitchen, and perform a gesture 204 in order to indicate that the user 206 would like the gesture 204 to control a particular function. The gesture 204 can be one that is already used by the user 206 to control one or more other functions of a computing device and/or an application. Alternatively, the gesture 204 can be one that the user 206 has not already used to control any function of a computing device and/or an application. Using prior permission from the user 206, a first computing device 208 can capture image data, using a camera interface, of the user 206 performing the gesture 204.

The image data can be captured with prior permission from the user 206, and be processed in order to identify any gestures that may have been performed by the user 206. Alternatively, or additionally, the image data can be stored temporarily at the first computing device 208, and be processed in response to determining that the user 206 has controlled some function of an application and/or a device within a period of time of performing the gesture 204. For example, preliminary processing can be performed on the image data to determine whether an already-established gesture has been performed, and if not, the image data can be stored temporarily, with permission from the user, should further processing be necessary. If the image data is stored without having previously determined that the image data captured any gesture, and the user 206 is determined to have previously or subsequently controlled a particular function, the image data can be further processed to identify whether the user performed any physical motion that could be characterized as an actionable gesture.

FIG. 2B illustrates the user 206 performing a direct touch input 216 at the second computing device 202, thereby controlling a function of the second computing device 202, such as a "turn on" oven light 212 function. The user 206 can perform the direct touch input 216 before or after performing the gesture 204 in FIG. 2A. In some implementations, the second computing device 202 can be an IoT device that is connected over a local area network to which the first computing device 208, and optionally, a third computing device 214 are also connected to. Therefore, with permission from the user 206, the first computing device 208 can access data characterizing operational properties of the second computing device 202 and the third computing device 214. For instance, an application for controlling the second computing device 202 can be accessible via the first computing device 208, and an application that is executing at the third computing device 214 can also be accessible via the first computing device 208.

In response to the user performing the direct touch input 216, the first computing device 208 can determine that the oven light 212 of the second computing device 202 has been turned on. Based on this determination, the first computing device 208, and/or another computing device that is associated with the first computing vice 208, can perform further processing on image data characterizing the gesture 204, with prior permission from the user 206. Processing of the image data can result in the first computing device 208 determining that the user performed the gesture 204 one or more times within a time period of the user providing the direct touch input 216 and/or otherwise controlling a function of the second computing device 202.

The time period can be a threshold time period that is static or dynamic, and/or can be based on the context of the user 206, the type of gesture performed, the type of function controlled, the type of device that captured the gesture via a camera interface, and/or any other feature from which a time period can be based. For example, a threshold time period within which the user 206 should perform a gesture and control a function, in order to have the gesture and function the mapped together, can be based on what amount of time that the function affects a status of an application and/or a device. In some implementations, the threshold time period can be directly proportional or inversely proportional to the amount of time that the function affects the status of the application and/or the device. For example, a threshold period time for mapping a gesture for preheating an oven can be smaller than a threshold period of time before mapping a gesture to the third computing device 214 for rendering an audible weather report. This difference in the threshold period of time can be based on the assumption that preheating the oven will take much longer then providing the weather report.

In some implementations, when the first computing device 208, and/or another computing device, determines that the user 206 controlled a function of the second computing device 202 within a threshold time period of performing the gesture 204, the first computing device 208 can optionally prompt the user regarding mapping the gesture 204 to the function. For example, the first computing device 208 can render an audio output 218 such as, "would you like the gesture to control the oven light?" In response, the user of 206 can provide a spoken utterance such as, "Yes, please." The spoken utterance 222 can be received by the first computing device 208 and/or the third computing device 214, with permission from the user, and can be processed to confirm that the user 206 would like the gesture 204 to be mapped to the function of the second computer device 202. In other words, the first computing device 208, or another computing device, can use data that identifies the gesture and data that identifies the function (controlling the oven light) and generate a natural language output as a query to the user 206, in order to confirm the mapping of the gesture 204 to the function.

FIG. 2C illustrates a view 230 of the user 206 performing the gesture 204, and, as a result, causing the oven light 212 of the second computing device 202 to turn on. Specifically, performance of the gesture 204 by the user 206 can be captured via a camera interface of the first computing device 208. Image data captured by the camera interface can be processed in order to determine that the user performed at the gesture 204. The first computing device 208 can then determine that the gesture 204 was successfully mapped to the function of turning on the oven light 212, and, in response, cause the oven light 212 to turn on.

In some implementations, the user 206 can indicate an interest in having a particular gesture mapped to a particular function of a device and/or an application, and the user 206 can be provided with suggestions regarding mapping other gestures to other functions. For example, in response to the user 206 confirming that they would like the gesture 204 to be mapped to the "turn on" oven light function, the first computing device 208 can identify other computing devices that are located in the room 210. Furthermore, the first computing device 208 can identify one or more functions of the other computing devices in the room 210 that have not been mapped to one or more particular gestures.

For example, the first computing device 208 can determine that the third computing device 214 provides access to a music application that the user 206 has frequently used. Furthermore, the first computing device 208 can determine that a "next song" function is not currently mapped to a physical motion gesture. Based on this determination, the first computing device 208 can render an audible suggestion such as, "Would you like the gesture to control a 'next song' function of the music application when the music application is executing at the third computing device?" The user 206 can confirm the mapping of the gesture 204 to the music application function, thereby causing the gesture 204 to control the music application when the music application is executing at the third computing device 214, and control the second computing device 202 when the music application is not executing at the third computing device 214. Alternatively, the rendered suggestion of the first computing device 208 can identify another gesture that is different from the gesture 204 to be mapped to the "next song" function of the music application. The other gesture can be identified based on data that characterizes gestures that other users have used to control a "next song" function of their respective music application.

Figure 3:
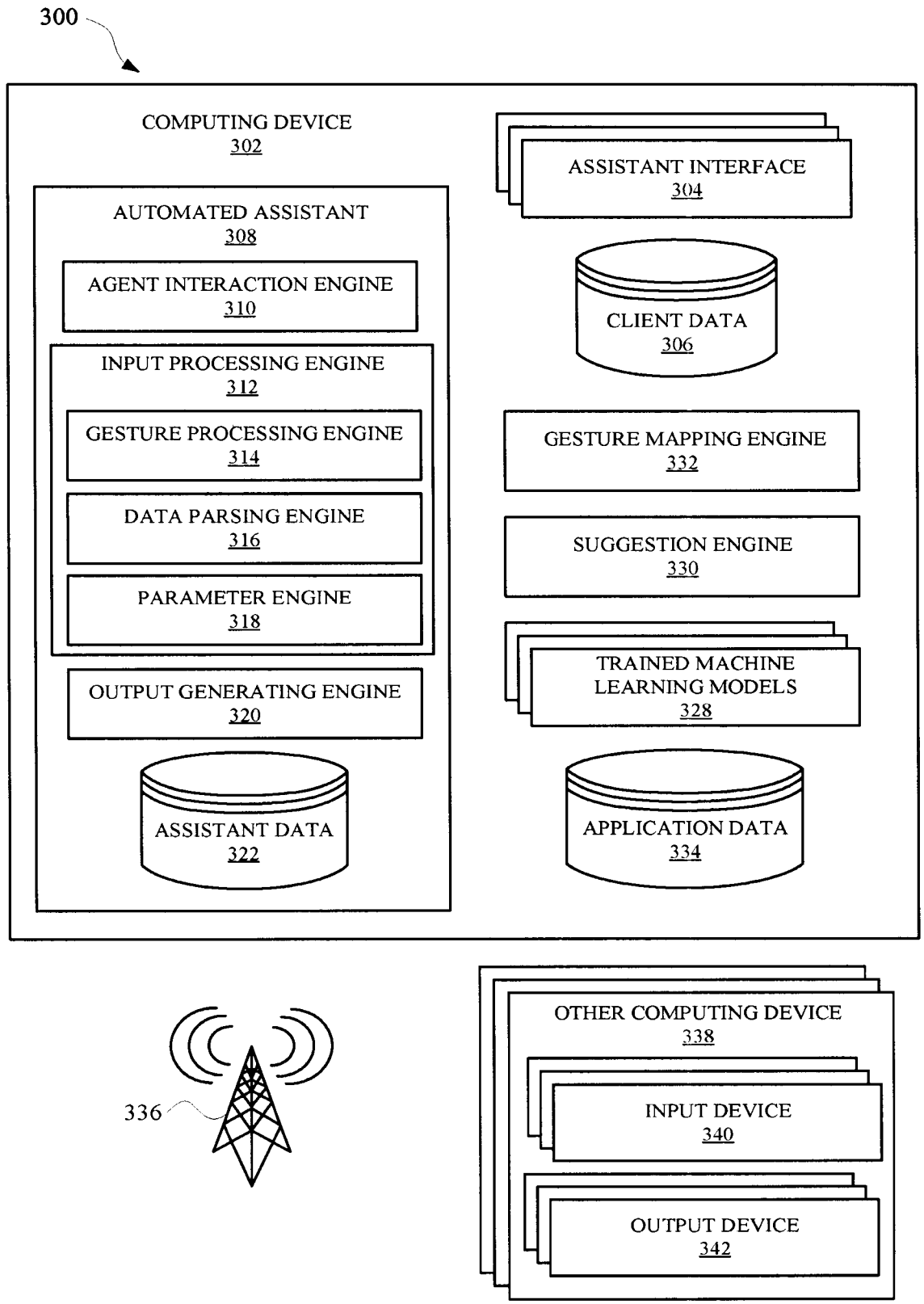
FIG. 3 illustrates a system for correlating available input gestures to newly provided functions, and adapting available input gestures, and/or user-created input gestures, to be correlated with existing functions.

FIG. 3 illustrates a system 300 for correlating available input gestures to newly provided application functions, and adapting available input gestures, and/or user-created input gestures, to be correlated with existing application functions. In some implementations, an automated assistant 308, which is accessible via another computing device 338, and/or via any other application or apparatus, can be responsive to one or more gestures. The automated assistant 308 can operate as part of an automated assistant application that is provided at one or more computing devices 302 and/or other computing device(s) 338. A user can interact with the automated assistant 308 via one or more assistant interfaces 304, which can include one or more of a microphone, a camera, a touch screen display, a user interface, and/or any other apparatus capable of providing an interface between a user and an application. For instance, a user can initialize the automated assistant 308 by providing a verbal, textual, physical motion, and/or a graphical input to the assistant interface to cause the automated assistant 308 to perform a function (e.g., provide data, control a device (e.g., control an IoT device), access an agent, modify a setting, control an application(s), etc.). The computing device 302 can include a display device, which can be a display panel that includes a touch interface for receiving touch inputs. The computing device 302 can also include a camera for capturing physical motion gestures, thereby allowing a user to control applications of the computing device 302 via the camera interface. The touch inputs and/or other gestures (e.g., spoken utterances, physical motion gesture captured by the camera interface) can also allow a user to interact with the automated assistant 308, and/or any other application that can be accessible via a computing device.

In some implementations, the computing device 302 can lack a display device but include an audio interface (e.g., a speaker and/or a microphone), thereby providing an audible user interface output, without providing a graphical user interface output, as well as providing a user interface, such as a microphone, for receiving spoken natural language inputs from a user. For instance, in some implementations, the computing device can include one or more tactile input interfaces, such as one or more buttons, and omit a display panel that would be provided graphical data from a graphics processing unit (GPU).

The computing device 302 can be in communication with a server device over a network, such as the internet. The computing device 302 can offload computational tasks to the server device in order to preserve computational resources at the computing device 302. For instance, the server device can host an automated assistant, and the computing device 302 can transmit inputs received at one or more assistant interfaces, and/or a user interface, to the server device. However, in some implementations, the automated assistant 308 can be hosted at the computing device 302. In various implementations, all or less than all aspects of the automated assistant 308 can be implemented on the server device and/or the computing device 302. In some of those implementations, aspects of the automated assistant 308 are implemented via a local automated assistant and interface with the server device, which can implement other aspects of the automated assistant 308. The server device can optionally serve a plurality of users and their associated assistant applications via multiple threads. In implementations where all or less than all aspects of the automated assistant 308 are implemented via a local automated assistant of the computing device 302, the local automated assistant can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 308 can include an input processing engine 312, which can employ multiple different engines for processing inputs and/or outputs for computing device 302. For instance, the input processing engine 312 can include a gesture processing engine 314 that can process image data and/or audio data received at an assistant interface 304 to identify a request intended by a user that has performed a gesture. The data can be transmitted from, for example, the computing device 302 to the server device in order to preserve computational resources at the computing device 302.

The process for interpreting image data as a gesture, corresponding to an actionable request, can include an image recognition algorithm, which can employ one or more trained machine learning models 328, and/or statistical models for identifying groups of pixel data corresponding to particular objects and/or physical motions. Information derived from the image data can be parsed by a data parsing engine 316 and made available to the automated assistant 308 as assistant data 322, which can be used to generate and/or identify requests from the user. In some implementations, output data provided by the data parsing engine 316 can be provided to an action engine 318 to determine whether the user has provided an input gesture that corresponds to a particular action, function, and/or routine capable of being performed by the automated assistant 308, an application, an agent, and/or device that is capable of being accessed via the computing device 302. For example, assistant data 322 can be stored at the server device and/or the computing device 302, and can also include data that defines one or more actions capable of being performed by the automated assistant 308 and/or the computing device 302, as well as parameters involved in performing those actions.

When the input processing engine 312 has determined that a user has requested a particular action or routine be performed, the action engine 318 can determine one or more parameter values for the particular action or routine, and an output generating engine 320 can then provide an output to the user based on the particular action, routine, and/or the one or more parameters (or otherwise control a function(s) according to the parameter value(s)). For instance, in some implementations, in response to a user input, such as a gesture directed at the assistant interface 304, the automated assistant 308 can cause data, which characterizes the gesture, to be transmitted to the server device for determining the action that the user is intending the automated assistant 308 to perform. When the gesture corresponds to a request for controlling a particular IoT device, the output generating engine 320 can cause an output to be provided to the user, via the assistant interface 304, indicating a result of an action performed by the IoT device.

In some implementations, various gestures identified by the gesture processing engine 314 can be captured at one or more assistant interfaces 304, and can include voice input, motion gestures, touch gestures, two-dimensional motion gestures, three-dimensional motion gestures, and/or any other gestures that can be identified by a computing device. In some implementations, the computing device 302 can be connected over a network 336 with one or more other computing device 338, which can include one or more input device 340, and one or more output device 342, respectively. The computing device 302 can store and/or access application data 334 that characterizes one or more applications that can be accessible to the other computing device(s) 338. Furthermore, a gesture mapping engine 332 of the computing device 302 can access the application data 334 in order to identify one or more functions of the one or more applications have are currently controllable via one or more gesture inputs.

When the gesture mapping engine 332 identifies a particular application function is not mapped to a particular gesture, or otherwise not configured to be controllable via a user input gesture, the gesture mapping engine 332 can communicate data, identifying the particular application function, to a suggestion engine 330. The suggestion engine 330 can use the identified application function in order to generate a suggestion for the user regarding using a particular physical motion gesture to control the identified application function. The suggestion engine 330 can select a particular physical motion gesture to recommend to the user by identifying, based on client data 306 stored at the computing device 302 or otherwise accessible via the computing device 302, one or more physical motion gestures that the user already employs to control one or more other functions.

In some implementations, the suggestion engine 330 can determine the physical motion gesture that the user performs most frequently, and recommend that the most frequently used physical motion gesture be mapped to the identified function that is not currently mapped to a gesture. Additionally, or alternatively, the suggestion engine 330 can determine the physical motion gesture that the user performs most accurately, relative to other physical motion gestures that the user performs. For example, a physical motion gesture that the user performs most accurately can be one that the computing device 302 has prompted the user to repeat the least. In other words, the gesture processing engine 314 can prompt the user to re-perform a gesture when the user has attempted to perform a physical motion gesture but, although the attempt was acknowledged by the automated assistant 308, the physical motion gesture did not result in an action being performed. Therefore, the suggestion engine 330 can determine a physical motion gesture that the user has performed most accurately, and thus with a least frequently amount of "corrective" re-performances, in order to provide a suggestion of a physical motion gesture to map to the identified application function. Additionally, or alternatively, the computing device 302 can determine that the identified function shares one or more parameters (e.g., function([parameter_1], [parameter_2], . . . [parameter_n]) with a certain application function. The computing device 302 can then identify another gesture that is mapped to that certain application function, and provide a suggestion for mapping the other gesture to the identified application function.

In some implementations, the gesture mapping engine 332 can identify a function the user has controlled previously but is not mapped to a gesture, and determine that one or more other users have mapped the function, or a similar function, to a particular physical motion gesture. The gesture mapping engine 332 can then identify the particular physical motion gesture for the suggestion engine 330, so that the suggestion engine 330 can cause the computing device, or another computing device, to provide a suggestion to the user for mapping the particular physical motion gesture to the identified function. For instance, the computing device 302 can access a remote computing device, such as a server device, which can identify physical motion gestures that others user perform to control certain application functions. The gesture mapping engine 332 can then identify the gesture that the other users are commonly using to control that certain application function and cause the suggestion engine 330 to recommend that that gesture for the user to map to the identified function.

In some implementations, the gesture mapping engine 332 can map a physical motion gesture to a function of an application and/or another computing device 338 based on the automated assistant 308 recognizing that the user performed a gesture one or more times within a time period that the user also controlled the function of the application. For instance, with prior permission from the user, an assistant interface 304, such as a camera, can capture image data that characterizes the user at least attempting to perform a physical motion gesture. Furthermore, the automated assistant 308 can determine that the user has controlled a particular function of another computing device 338, within a time period of performing the physical motion gesture. For example, the time period can be 5 seconds before controlling the particular function and/or 5 seconds after controlling the particular function. Therefore, if the user performs the physical motion gesture one or more times within 3 seconds of controlling the function, the gesture mapping engine 332 can map the physical motion gesture to the particular function.

In some implementations, the user can be prompted to confirm that the user would like the physical motion gesture to be mapped to the function of an application that is accessible via another computing device 338. For instance, the gesture mapping engine 332 can confirm that that the user performed a physical motion gesture one or more times within a time period of controlling the function, and then communicate this occurrence to the suggestion engine 330. In response, the suggestion engine 330 can cause the computing device 302 to provide a graphical element that includes a request for the user to confirm whether the physical motion gesture they performed should be mapped to the function that they controlled recently. If the user confirms, the suggestion engine 330 can communicate this confirmation to the gesture mapping engine 332, which generate data characterizing and/or establishing the mapping of the physical motion gesture to the function of the application.

Figure 4A:
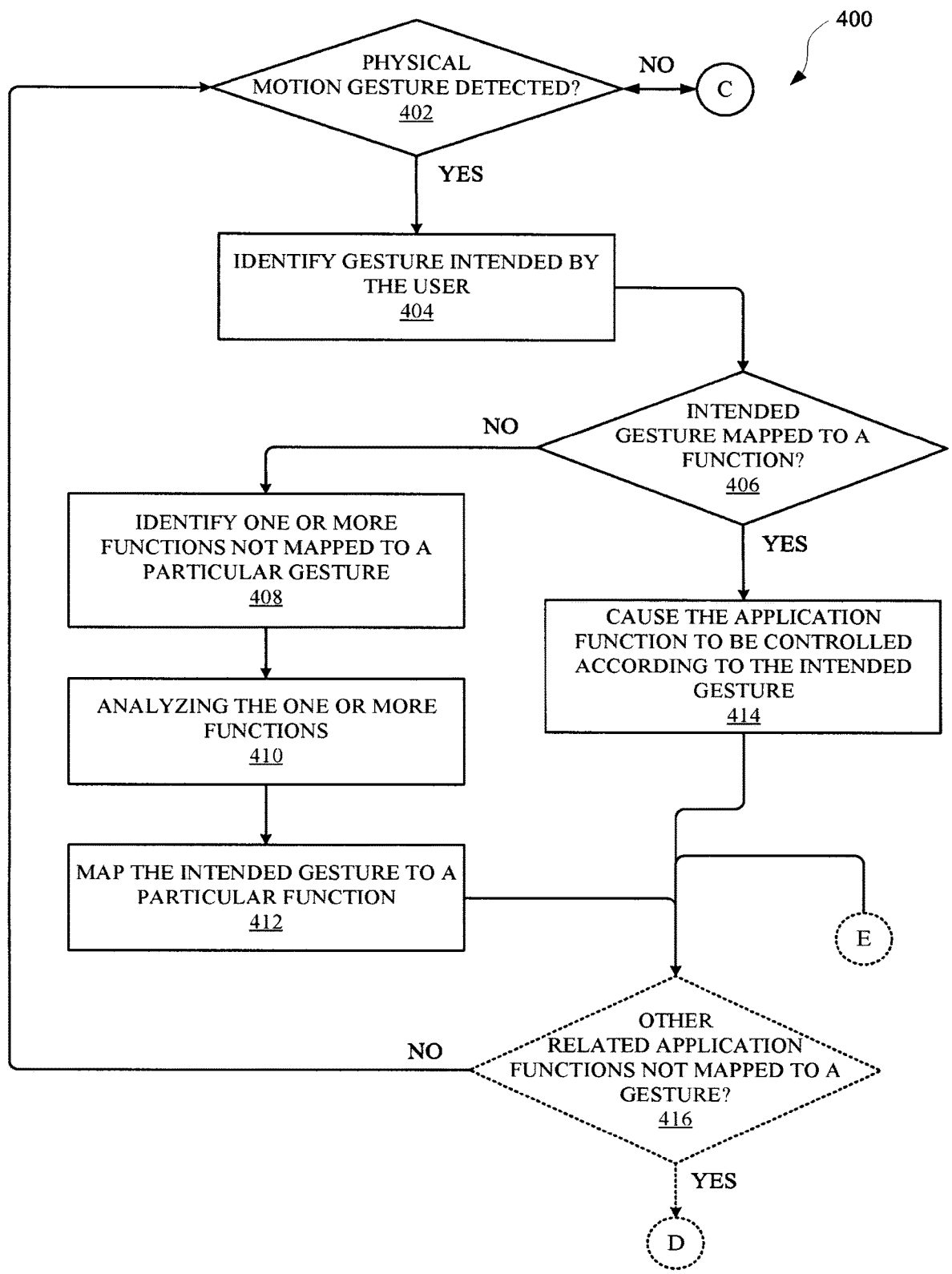
FIGS. 4A and 4B illustrate methods for mapping one or more physical motion gestures to one or more functions, accessible via one or more devices and/or one or more applications.
Figure 4B:
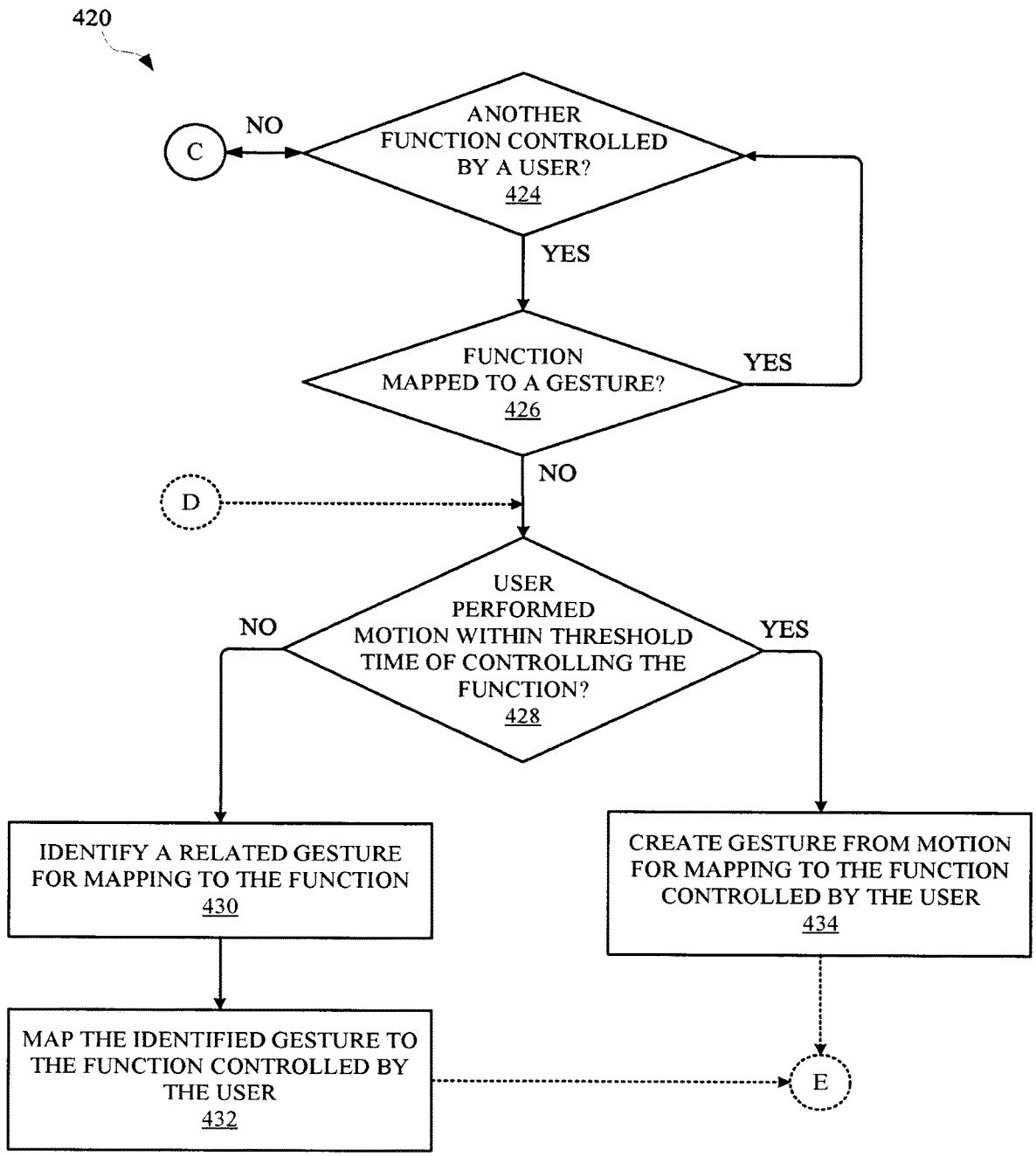

FIGS. 4A and 4B illustrate a method 400 and a method 420 for mapping one or more physical motion gestures to one or more functions, accessible via one or more devices and/or one or more applications. The method 400 and the method 420 can be performed together, or separately. The method 400 and/or the method 420 can be performed by one or more applications, computing devices, and/or any other apparatus or module capable of responding to a user input. The method 400 can include an operation 402 of determining whether a physical motion gesture has been detected at one or more computing device interfaces. A computing device interface can include any interface with which a user can provide an input to a computing device. For instance the computing device interface can include a camera interface, which can generate an output that characterizes a physical motion gesture that is performed by a user. The output of the camera interface can be used to generate image data from which the operation 402 can be determined. For example, when the user has not performed a physical motion gesture, the image data will not indicate that the user performed a physical motion gesture, and therefore the method 400 can proceed from the operation 402 to an operation 424, according to continuation element "C." The continuation element "C" can represent a continuation between the method 400 and the method 420, and the continuation can be from the operation 402 to the operation 424, and/or from the operation 424 to the operation 402.

The operation 424 can include determining that a function (or another function) controlled by the user. If a function (or another function) has not been controlled by the user, the method 420 can return to the operation 402 via the continuation element "C." However, if the function has been controlled by the user, the method 420 can proceed from the operation 424 to the operation 426. Similarly, if a physical motion gesture is detected at the operation 402, the method 400 can proceed from the operation 402 to the operation 404.

The operation 404 can include identifying a gesture intended by the user. In order to identify the gesture intended by the user, image data that captures the physical motion gesture performed by the user can be processed. In some implementations, the image data can be applied to one or more trained machine learning models, and a gesture can be identified based on the one or more trained machine learning models. Alternatively, or additionally, the image data can be compared to existing data characterizing one or more different available gestures, and, based on the comparing, determine that the identified gesture is one of the one or more different available gestures. When the intended gesture is identified at operation 404, the method 400 can proceed to an operation 406.

The operation 406 can include determining whether the intended gesture is mapped to a function. In other words, a determination is made as to whether there is any data that correlates the intended gesture to a function, which can be otherwise controllable via a computing device and/or an application. If the intended gesture is mapped to a function, the method 400 can proceed from the operation 406 to the operation 414. At the operation 414, the function can be controlled according to the intended gesture. For example, the function can be executed, modified, and/or stopped depending on how the gesture is mapped to the particular function, and/or how the function is configured.

When the intended gesture is not mapped to a function, the method 400 can proceed from the operation 406 to the operation 408. The operation 408 can include identifying one or more functions not currently mapped to a particular gesture. In this way, the method 400 ensures that the intended gesture is not mapped to a function that is already correlated to a gesture, unless the user is explicitly requesting such a configuration. The one or more functions not mapped to a particular gesture can be identified from functions that the user has controlled previously, functions that are accessible via one or more applications and/or one or more computing devices associated with the user, and/or any other functions that can be mapped to a particular gesture. When one or more functions that are not mapped to a particular gesture are identified at the operation 408, the method 400 can proceed to the operation 410.

The operation 410 can include analyzing the one or more functions. Analyzing the one or more identified functions can include determining parameters for the one or more functions. Alternatively, or additionally, analyzing the one or more functions can include determining a frequency of use of the one or more functions by the user, and/or other users. Alternatively, or additionally, analyzing the one or more functions can include determining a frequency of use of a computing device and/or an application with which the user has accessed and/or controlled the one or more functions. In some implementations, the operation 410 can include prompting the user to verify whether they would like the identify gesture to be mapped to a particular function of the one or more identified functions. When the user confirms, the intended gesture can be mapped to the particular function.

The method 400 can proceed from the operation 410 to the operation 412, which can include mapping the intended gesture to a function of the identified one or more functions. In this way if the user subsequently performs an instance of the identified gesture, the particular function can be controlled according to the mapping at operation 412. Therefore, if the mapping of the intended gesture to the particular function includes executing the particular function when the intended gesture is performed, the user's subsequent performance of the intended gesture will cause execution of a particular function (e.g., muting a microphone during a phone call).

Optionally, the method 400 can proceed from the operation 412 to an optional operation 416. The optional operation 416 can include determining whether other related functions have not been mapped to another gesture. For example, a determination can be made as to whether there are any other functions of an application corresponding to the recently mapped function, and whether any of those other functions have also been mapped to any other gestures. If there is another function that has not been mapped to a particular gesture, a suggestion can be provided to the user for confirming where the user would like another function mapped to another gesture. If the user would like another function mapped to another gesture, the method 400 can proceed to the method 420, via continuation element "D," which is continues to an operation 428 of the method 420.

When the method 400 transitions from operation 402, to the operation 424, a determination can be made as to whether another function has been controlled by the user. The method 420 can then proceed from the operation 424 to the operation 426. The operation 426 can include determining whether a particular function (e.g., a function recently controlled by the user) has been mapped to a particular gesture. If a function that has been recently controlled by a user is mapped to a particular gesture already, the method 420 can proceed from the operation 426 back to the operation 424, where a computing device can await control, by a user(s), of another function, or continue via continuation element "C" to the operation 402. However, if the particular function controlled by the user has not been mapped to a particular gesture, the method 420 can proceed to an operation 428.

The operation 428 can include determining whether the user performed a motion within a threshold period of time of controlling the function. Determining whether user performed a motion can include determining whether the user performed a motion that is discernible as a physical motion gesture, and that is different from frequent motions that are not typically intended to trigger an application action and/or a computing device action. For instance, determining whether the user performed a motion can include determining whether the user performed at least a portion of an available gesture, which the user previously had not performed before, but that is otherwise capable of being used to control an application and/or a computing device associated with the user. If the user performed a "motion" within the threshold period of time of controlling the function, the method 420 can proceed from the operation 428 to the operation 434. The operation 434 can including creating a gesture from the motion, which was performed by the user, and mapping the created gesture to the function that was controlled by the user. The method 420 can then proceed from the operation 434, via continuation element "E," to the operation 416.

However, if the user did not perform a motion within the threshold period of time of controlling the function, the method 420 can proceed from the operation 428 to the operation 430. The operation 430 can include identifying a candidate gesture for mapping to the function that was controlled by the user (and/or another function that will be suggested for mapping to an identified gesture—if continuing from continuation element "D"). Candidate gestures for mapping to the function can include: gestures that the user has performed previously, gestures that include the same motion that the user performed (e.g. the motion identified at operation 428), gestures that other users performed to control the function, a gesture that has been newly assigned by a manufacturer to the function, and/or any other gestures that a computing device can be responsive to.

When a gesture for mapping to the function is identified, the method 420 can proceed from the operation 430 to the operation 432. The operation 432 can include mapping the identified gesture to the function controlled by the user, or any other function that has been identified during performance of the method 400 and/or the method 420. The method 420 can then proceed from the operation 432, via the continuation element "E," to the operation 416.

Figure 5:
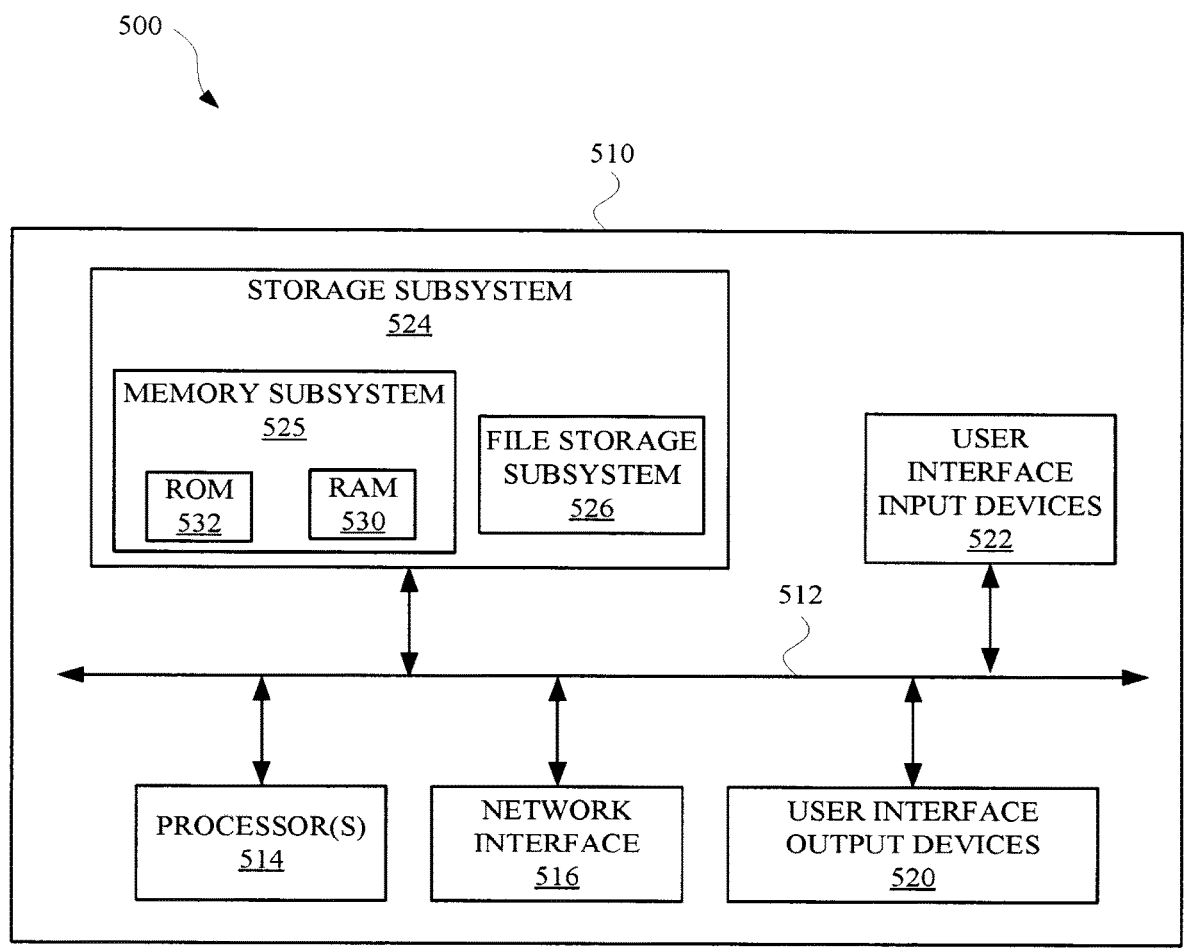
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, method 420, and/or to implement one or more of first computing device 102, second computing device 134, first computing device 208, second computing device 202, third computing device 214, computing device 302, automated assistant 308, gesture mapping engine 332, suggestion engine 330, trained machine learning models 328, other computing device(s) 338, and/or any other device, operation, application, and/or engine discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
    processing image data, captured via a camera interface of a computing device, which characterizes a physical motion gesture has been provided by a user to the computing device,
        wherein the computing device is controllable via the physical motion gesture, and
        wherein an application, which is accessible via the computing device, is currently not configured to be controllable via the physical motion gesture;
    determining that the application includes an application function that is being used by the user, and that the application function is not configured to be controllable via the physical motion gesture provided by the user to the camera interface of the computing device;
    causing, based on determining that the application function is not configured to be controllable via the physical motion gesture, correlation data to be generated for correlating the physical motion gesture to the application function in furtherance of allowing the user to control the application function of the application via the physical motion gesture;
    determining, subsequent to generating the correlation data, whether the user has performed the physical motion gesture in furtherance of controlling the application function of the application;
    when the user is determined to have performed the physical motion gesture in furtherance of controlling the application function of the application and subsequent to the correlation data being generated:
        causing, in response to determining that the user performed the physical motion gesture in furtherance of controlling the application function of the application, the application function to be controlled via the application; and
    subsequent to generating the correlation data:
        determining that a separate application function of an additional application that is accessible via the computing device is not configured to be controllable via any physical motion gesture;
        determining that the separate application function shares one or more parameters with the application function; and
        causing, based on determining that the separate application function is not configured to be controllable via any physical motion gesture and based on determining that the separate application function shares one or more of the parameters with the application function, additional correlation data to be generated for correlating the physical motion gesture to the separate application function in furtherance of allowing the user to control the separate application function of the additional application via the physical motion gesture.

2. The method of claim 1, wherein the application function is not directly executable via the computing device without the application executing at the computing device.

3. The method of claim 1, further comprising:
causing, prior to the correlation data being generated, a prompt to be provided at the computing device requesting that the user confirm correlating the physical motion gesture to the application function of the application.

4. The method of claim 1, wherein determining that the application includes the application function that is being used by the user includes:
determining that the physical motion gesture has been performed by the user more frequently than the user has performed at least one other physical motion gesture.

5. The method of claim 4, wherein determining that the application includes the application function that is being used by the user includes:
determining that the physical motion gesture has been performed more accurately by the user than another user has performed the physical motion gesture at a different computing device.

6. The method of claim 1, wherein determining that the application includes the application function that is being used by the user includes:
determining that the user has controlled multiple different application functions of the application, wherein the multiple different application functions include the application function, and
determining that the application function has been controlled, by the user, more frequently relative to other application functions of the multiple different application functions have been controlled by the user.

7. The method of claim 1, further comprising:
determining, subsequent to generating the correlation data, that an additional application function of the application is not currently configured to be controllable via a particular motion gesture that is different from the physical motion gesture; and
causing, based on determining that the additional application function of the application is not currently configured to be controllable via the particular motion gesture, other correlation data to be generated for correlating the particular motion gesture to the additional application function in furtherance of allowing the user to control the additional application function of the application via the particular motion gesture.

8. The method of claim 7, further comprising:
determining, prior to determining that the application includes the application function that is being used by the user, that the user has controlled the application function of the application more frequently than the user has controlled the separate application function.

9. The method of claim 1, further comprising:
identifying another application function of the application that is not currently configured to be controllable via another physical motion gesture captured via the camera interface of the computing device; and
when the user confirms they intended the physical motion gesture to control the application function of the application:

causing the interface of the computing device to provide another request for permission from the user to allow the other application function to be controllable via the other physical motion gesture.

10. A system comprising:
one or more processors; and
memory configured to store instructions that, when executed by the one or more processors cause the one or more processors to perform operations that include:
processing image data, captured via a camera interface of a computing device, which characterizes a physical motion gesture has been provided by a user to a computing device,
wherein the computing device is controllable via the physical motion gesture, and
wherein an application, which is accessible via the computing device, is currently not configured to be controllable via the physical motion gesture;
determining that the application includes an application function that is being used by the user, and that the application function is not configured to be controllable via the physical motion gesture provided by the user to the camera interface of the computing device;
causing, based on determining that the application function is not configured to be controllable via the physical motion gesture, correlation data to be generated for correlating the physical motion gesture to the application function in furtherance of allowing the user to control the application function of the application via the physical motion gesture;
determining, subsequent to generating the correlation data, whether the user has performed the physical motion gesture in furtherance of controlling the application function of the application;
when the user is determined to have performed the physical motion gesture in furtherance of controlling the application function of the application and subsequent to the correlation data being generated:
causing, in response to determining that the user performed the physical motion gesture in furtherance of controlling the application function of the application, the application function to be controlled via the application; and
subsequent to the correlation data being generated:
determining that a separate application function of an additional application that is accessible via the computing device is not configured to be controllable via any physical motion gesture;
determining that the separate application function shares one or more parameters with the application function; and
causing, based on determining that the separate application function is not configured to be controllable via any physical motion gesture and based on determining that the separate application function shares one or more of the parameters with the application function, additional correlation data to be generated for correlating the physical motion gesture to the separate application function in furtherance of allowing the user to control the separate application function of the additional application via the physical motion gesture.

11. The system of claim 10, wherein the application function is not directly executable via the computing device without the application executing at the computing device.

12. The system of claim 10, wherein the operations further comprise:
   causing, prior to the correlation data being generated, a prompt to be provided at the computing device requesting that the user confirm correlating the physical motion gesture to the application function of the application.

13. The system of claim 10, wherein determining that the application includes the application function that is being used by the user includes:
   determining that the physical motion gesture has been performed by the user more frequently than the user has performed at least one other physical motion gesture.

14. The system of claim 13, wherein determining that the application includes the application function that is being used by the user includes:
   determining that the physical motion gesture has been performed more accurately by the user than another user has performed the physical motion gesture at a different computing device.

15. The system of claim 10, wherein determining that the application includes the application function that is being used by the user includes:
   determining that the user has controlled multiple different application functions of the application, wherein the multiple different application functions include the application function, and
   determining that the application function has been controlled, by the user, more frequently relative to other application functions of the multiple different application functions have been controlled by the user.

16. The system of claim 10, wherein the operations further comprise:
   determining, subsequent to generating the correlation data, that an additional application function of the application is not currently configured to be controllable via a particular motion gesture that is different from the physical motion gesture; and
   causing, based on determining that the additional application function of the application is not currently configured to be controllable via the particular motion gesture, other correlation data to be generated for correlating the particular motion gesture to the additional application function in furtherance of allowing the user to control the additional application function of the application via the particular motion gesture.

17. The system of claim of claim 16, wherein the operations further comprise:
   determining, prior to determining that the application includes the application function that is being used by the user, that the user has controlled the application function of the application more frequently than the user has controlled the separate application function.

18. The system of claim 10, wherein the operations further comprise:
   identifying another function of the application that is not currently configured to be controllable via another physical motion gesture captured via the camera interface of the computing device; and
   when the user confirms they intended the physical motion gesture to control the application function of the application:
      causing the interface of the computing device to provide another request for permission from the user to allow the other function to be controllable via the other physical motion gesture.

19. A non-transitory computer readable storage medium configured to store instructions that, when executed by one or more processors, cause the one or more processors to perform operations that include:
   processing image data, captured via a camera interface of a computing device, which characterizes a physical motion gesture has been provided by a user to a computing device,
      wherein the computing device is controllable via the physical motion gesture, and
      wherein an application, which is accessible via the computing device, is currently not configured to be controllable via the physical motion gesture;
   determining that the application includes an application function that is being used by the user, and that the application function is not configured to be controllable via the physical motion gesture provided by the user to the camera interface of the computing device;
   causing, based on determining that the application function is not configured to be controllable via the physical motion gesture, correlation data to be generated for correlating the physical motion gesture to the application function in furtherance of allowing the user to control the application function of the application via the physical motion gesture;
   determining, subsequent to generating the correlation data, whether the user has performed the physical motion gesture in furtherance of controlling the application function of the application;
   when the user is determined to have performed the physical motion gesture in furtherance of controlling the application function of the application and subsequent to the correlation data being generated:
      causing, in response to determining that the user performed the physical motion gesture in furtherance of controlling the application function of the application, the application function to be controlled via the application; and
   subsequent to generating the correlation data:
      determining that a separate application function of an additional application that is accessible via the computing device is not configured to be controllable via any physical motion gesture;
      determining that the separate application function shares one or more parameters with the application function; and
      causing, based on determining that the separate application function is not configured to be controllable via any physical motion gesture and based on determining that the separate application function shares one or more of the parameters with the application function, additional correlation data to be generated for correlating the physical motion gesture to the separate application function in furtherance of allowing the user to control the separate application function of the additional application via the physical motion gesture.

20. The non-transitory computer readable storage medium of claim 19, wherein the application function is not directly executable via the computing device without the application executing at the computing device.

* * * * *